United States Patent Office 2,831,025
Patented Apr. 15, 1958

2,831,025
TETRAFLUOROOXOCARBONYL COMPOUNDS

John J. Drysdale, Clifton Park Manor, Del., assignor to E. I. du Pont de Nemours and Company, Wilmington, Del., a corporation of Delaware No Drawing. Application April 13, 1956
Serial No. 577,918

15 Claims. (Cl. 260—539)

This invention relates to fluoride-containing compounds. More particularly, it relates to fluorinated compounds having two carbonyl groups, and to a method for their preparation.

This application is a continuation-in-part of my copending application Serial No. 454,607, filed September 7, 1954.

Organic compounds having carbonyl groups are useful in a wide variety of applications due to the large number of reactions which such groups undergo. It is therefore desirable to provide new compounds of this type having specific characteristics valuable in particular applications.

This invention has as an object the preparation of new fluorinated oxo carbonyl compounds. A further object is the preparation of intermediates for plasticizers and resins. Other objects will appear hereinafter.

These objects are accomplished by the present invention of tetrafluoro compounds having two carbonyl,

groups separated by an acyclic chain of four carbon atoms having two fluorine atoms on each of two adjacent carbons and two hydrogen atoms on each of the two remaining carbons in the chain, one of the carbonyl groups being an oxo carbonyl group, i. e., having its remaining valence attached to hydrogen or to a monovalent hydrocarbon radical free from non-aromatic unsaturation, i. e., aliphatically saturated, the remaining valence on the other carbonyl being attached to hydrogen, a hydroxyl radical or a monovalent hydrocarbon radical free from non-aromatic unsaturation, i. e., aliphatically saturated. These compounds are all capable of reacting with aldehyde- and ketone-reactive reagents, e. g., phenylhydrazine, etc.

The tetrafluoroketaldonyl compounds of this invention are prepared by ozonization of tetrafluorocyclohexenes having two fluorine atoms attached to each of two adjacent carbon atoms of the cyclohexene ring, having two hydrogen atoms attached to each of the remaining saturated annular carbons, and the remaining valences of each unsaturated annular carbon being joined to hydrogen or to a monovalent hydrocarbon radical free from non-aromatic unsaturation, e. g., an alkyl, aryl, or cycloalkyl radical, followed by cleavage of the resultant ozonide. What specific dicarbonyl compound is obtained in any particular instance depends upon the particular substituents on the unsaturated carbons of the tetrafluorocyclohexene ring and on the particular conditions employed in the cleavage step.

A preferred manner of carrying out the process of this invention comprises passing a stream of oxygen containing a small amount, e. g., 2%, of ozone through a solution of the tetrafluorocyclohexene in an inert solvent, e. g., methylene chloride, maintained at low temperature, e. g., at about −70 to −80° C. by means of a bath of acetone and solid carbon dioxide, until absorption of ozone ceases. This end point is readily observed since any excess ozone forms a blue color in the methylene chloride reaction medium.

When the starting tetrafluorocyclohexene has only hydrogen attached to the unsaturated annular carbons, either a dialdehyde or an aldehyde acid is formed in the process of this invention. The dialdehyde is formed when the cleavage is carried out in the presence of zinc dust and acetic acid, either glacial or aqueous acetic acid. The aldehyde acid is formed when the cleavage is carried out in the presence of glacial acetic acid and a catalytic amount of a strong anhydrous acid, e. g., hydrogen chloride or p-toluenesulfonic acid. Thus, when the starting tetrafluorocyclohexene has only hydrogen on the unsaturated annular atoms, i. e., is 3,3,4,4- or 4,4,5,5-tetrafluorocyclohexene, the cleavage is carried out with avoidance of oxidizing conditions.

When the starting tetrafluorocyclohexene has one of the unsaturated annular carbons joined to a hydrocarbon radical, a ketoaldehyde is formed by carrying out the cleavage of the ozonide in the presence of acetic acid, either glacial or aqueous acetic acid, and zinc dust; and a keto acid, RCO—C$_4$F$_4$H$_4$·COOH wherein RCO is an acyl group, is formed by performing the cleavage in the presence of aqueous acids with or without hydrogen peroxide.

When both the unsaturated carbons of the tetrafluorocyclohexene starting material are substituted with monovalent hydrocarbon radicals, the cleavage of the ozonide is carried out in the presence of aqueous acid and in the presence of a valence electron transfer agent, i. e., a reducing agent or an oxidizing agent, e. g., either zinc dust or hydrogen peroxide, to form a diketone.

When the cleavage of the ozonide is carried out in the presence of hydrogen peroxide, the methylene chloride solution of the ozonide is added gradually to an aqueous solution of hydrogen peroxide containing at least one mole but preferably a 100% excess, of hydrogen peroxide for each mole of the ozonide being reacted, and acidified with a strong acid, e. g., sulfuric acid. The cleavage reaction is exothermic and the reaction mixture is allowed to reflux slowly with the methylene chloride being allowed to distill off, if necesary by the external application of heat, until the reaction mixture becomes clear. The reaction mixture is then cooled to about 25° C. and is extracted with diethyl ether. The ether-acetic acid layer is evaporated to dryness under reduced pressure. The resulting residue can be purified by conventional means, e. g., by distillation if a liquid and by recrystallization if a solid.

When the cleavage of the ozonide is carried out in the presence of zinc dust, the methylene chloride solution of the ozonide is added to acetic acid, either glacial or aqueous acetic acid, containing one gram-atom of zinc dust for each mole of ozonide being cleaved. The mixture is then heated and the methylene chloride is allowed to distill off. The acid mixture is then extracted with diethyl ether, after which the ether extract is neutralized with sodium bicarbonate and is then distilled under reduced pressure.

When the cleavage of the appropriate ozonide is carried out in the absence of hydrogen peroxide and zinc dust, the methylene chloride solution of the ozonide is simply heated with aqueous acetic acid, acidified with hydrochloric acid and the resulting product, which is an aldehyde acid where the starting material has hydrogen on each doubly bonded carbon or a ketone acid where the starting material has a hydrocarbon radical on one doubly bonded carbon, is purified by conventional means.

If desired, the methylene chloride solvent used in the ozonization step can be removed before the ozonide is cleaved. In this embodiment the methylene chloride can be evaporated at reduced pressure and the residue then dissolved in glacial acetic acid or other cleavage medium and the cleavage carried out as described above.

The process of this invention is not limited to the use of methylene chloride as the ozonization medium. Other inert solvents, i. e., solvents for the reactants that resist oxidation, can be used, e. g., glacial acetic acid and ethyl acetate. These solvents are especially useful when the reaction is carried out at room temperature.

The ozonization can be carried out at temperatures ranging from about $-80°$ C. up to the temperature at which the ozonide decomposes, e. g., 25–100° C. However, it is preferred that the reaction be carried out at low temperature, e. g., $-70$ to $-80°$ C., in order to minimize the possibility for violent reaction taking place.

The cleavage can be carried out at moderately elevated temperatures, e. g., at temperatures of about 50° C. up to 125° C. When the cleavage step is carried out in the presence of hydrogen peroxide or zinc the reaction is exothermic; however, it is often convenient to apply external heat, as needed, to cause the mixture to reflux. In other types of cleavage, the reaction mixture can also be heated externally to reflux temperature.

The starting materials used in the process of this invention are 3,3,4,4- and 4,4,5,5-tetrafluoro-1-cyclohexenes in which one or both of the unsaturated annular carbons are attached to hydrogen or to monovalent hydrocarbon radicals which are aliphatically saturated, i. e., free from non-aromatic unsaturation. Since such tetrafluorocyclohexenes having hydrocarbon, preferably alkyl, substituents of up to six carbon atoms are more readily available, they are a preferred group of starting materials. These fluorocyclohexenes are prepared by pyrolysis of 1-vinyl-2,2,3,3-tetrafluorocyclobutanes at 650–750° C. This pyrolysis process is described in greater detail in my copending U. S. application Ser. No. 454,607, filed September 7, 1954. The 1-vinyl-2,2,3,3-tetrafluorocyclobutanes can be prepared by the process described in U. S. Patent 2,462,347, issueed to P. L. Barrick.

Ozone prepared by passing air or oxygen through commercially available ozone generators is operable in the process of this invention. The concentration of ozone in the air or oxygen is not critical. Any concentration produced by the generator can be used; however, extremely low concentrations require very long reaction times.

The following examples in which parts are by weight are illustrative of the invention.

*Example I*

Approximately 3.5 parts of 1,2-dimethyl-3,3,4,4-tetrafluoro-1-cyclohexene is dissolved in 67 parts of methylene chloride and a stream of oxygen containing 2% ozone is passed through the solution at a rate of 0.1 cubic foot/minute for a period of two hours at a temperature of $-78°$ C. At the end of this time the reaction mixture becomes blue in color, due to excess ozone. The resulting methylene chloride solution is added to 50 parts of a 50%, by volume, aqueous solution of acetic acid which contains 1.25 parts of zinc dust. The mixture is heated and the methylene chloride is allowed to distill off. The residual acid mixture is extracted with diethyl ether (approximately 50 parts) and the ether extract is neutralized with sodium bicarbonate. Distillation of the ether extract gives 1.5 parts of 2,7-diketo-3,3,4,4-tetrafluorooctane, boiling at 53° C./0.4 mm. mercury, and having a refractive index, $n_D^{25}$, of 1.3826.

*Analysis.*—Calculated for $C_8H_{10}F_4O_2$: C, 44.87%; H, 4.70%; F, 35.50%. Found: C, 44.84%; H, 4.82%; F, 36.09%, 36.13%.

The infrared absorption spectrum for this product also confirms the indicated structure.

*Example II*

2-methyl-3,3,4,4-tetrafluoro-1-cyclohexene (2.3 parts) is dissolved in 25 parts of methylene chloride and the mixture is cooled to $-78°$ C. A stream of oxygen containing 2% ozone is passed through the cold mixture at a rate of 0.1 cubic foot/minute until the reaction mixture turns blue due to the presence of an excess of ozone. The methylene chloride is then removed and the residue is heated with 50 parts of 50% aqueous acetic acid, 3 parts of 30% hydrogen peroxide, and 3.6 parts of concentrated sulfuric acid. The temperature of the acid mixture increases due to the heat of reaction. External heat is applied as necessary to maintain the mixture at reflux temperature until a clear solution is obtained. The reaction mixture is then cooled to about 25° C. and extracted with diethyl ether. The ether-acetic acid layer is evaporated to dryness under reduced pressure. The ressulting residue of 6-keto-4,4,5,5-tetrafluoroheptanoic acid is distilled and there is obtained 0.9 part of this keto acid having a boiling point of 87° C./0.2 mm. mercury and having a refractive index, $n_D^{25}$, of 1.3855.

*Analysis.*—Calculated for $C_7H_8F_4O_3$: C, 38.89%; H, 3.72%; F, 35.16%; N. E., 216. Found: C, 38.14%; H, 4.13%; F, 35.11%, 35.32%; N. E., 249, 257.

When the 2-methyl-3,3,4,4-tetrafluoro-1-cyclohexene of Example II is replaced by an equivalent quantity of 2-methyl-4,4,5,5-tetrafluoro-1-cyclohexene and the procedure of that example is repeated, there is obtained 6-keto-3,3,4,4-tetrafluoroheptanoic acid.

*Example III*

Thirty-six parts of 3,3,4,4-tetrafluorocyclohexene in 133 parts of methylene chloride is ozonized as in Example I. The resulting solution of the ozonide is added dropwise to a mixture of 16 parts of zinc dust in 100 parts of glacial acetic acid and 100 parts of distilled water. When the reaction is complete, 100 parts of water is added and the solution is saturated with sodium chloride. The saturated solution is extracted with approximately 200 parts of diethyl ether. The ether extract is distilled and there is obtained 20 parts of product boiling at 48–52° C./6 mm. Hg, and having a refractive index, $n_D^{27}$, of 1.3800. This is a hydrate of 2,2,3,3-tetrafluorohexane dialdehyde as indicated by its conversion, by treatment with phosphorus pentoxide, to 3,3,4,4-tetrafluoro-1-cyclopentene-1-aldehyde, boiling at 144° C., and having a refractive index, $n_D^{26}$, of 1.3930. The cyclopentenealdehyde is identified by nuclear magnetic resonance analysis. This cyclopentenealdehyde is the expected product from the 2,2,3,3-tetrafluorohexane dialdehyde.

When the 3,3,4,4-tetrafluoro-1-cyclohexene of Example III is replaced by an equivalent quantity of 4,4,5,5-tetrafluoro-1-cyclohexene and the ozonolysis is carried out in the same way as in that example, there is obtained 3,3,4,4-tetrafluorohexanedial.

*Example IV*

A solution of 30 parts of 3,3,4,4-tetrafluorocyclohexene in 67 parts of methylene chloride is ozonized as in the preceding examples. The solution of the resultant ozonide is placed in 105 parts of acetic acid containing 1.1 part of concentrated hydrochloric acid. The methylene chloride is then removed by distillation, and the residue is heated at reflux temperature for four hours. The acetic acid is removed by distillation under reduced pressure and about 1/6 of the residue is then subjected to distillation to give approximately 3 parts of material boiling at 90°–140° C. at 0.3–0.6 mm. pressure. Nuclear magnetic resonance analysis of this product indicates that it is a mixture of 5 - formyl - 4,4,5,5-tetrafluoropentanoic acid, 5-formyl-2,2,3,3-tetrafluoropentanoic acid, and some unreacted ozonide.

The examples have illustrated the products of this invention by specific reference to certain 1,6-dicarbonyl compounds. However, the invention includes other tetrafluoroketaldonyl compounds having two carbonyl groups separated by a chain of four carbon atoms having two fluorine atoms on each of two adjacent carbons and two hydrogen atoms on each of the two remaining carbons in the chain, with the remaining valence of one of the carbonyl groups attached to hydrogen or a monovalent hydrocarbon radical free from non-aromatic unsaturation and preferably of no more than six carbon atoms, and the remaining valence of the other carbonyl group attached to hydrogen, a monovalent hydrocarbon radical or to a hydroxyl radical. Thus, by ozonolysis, i. e., ozonization and cleavage, by the process of this invention, from the following tetrafluorocyclohexenes:

1-phenyl-3,3,4,4-tetrafluoro-1-cyclohexene,
2-cyclohexyl-3,3,4,4-tetrafluoro-1-cyclohexene,
2-hexyl-4,4,5,5-tetrafluoro-1-cyclohexene,
1,2-di-n-butyl-3,3,4,4-tetrafluoro-1-cyclohexene,
2-ethyl-3,3,4,4-tetrafluoro-1-cyclohexene,
2-(1-naphthyl)-3,3,4,4-tetrafluoro-1-cyclohexene, and
2-methyl-4,4,5,5-tetrafluoro-1-cyclohexene there are obtained the following tetrafluoro-1,6-dicarbonyl compounds:

5-benzoyl-2,2,3,3-tetrafluoropentanoic acid,
6-cyclohexyl-4,4,5,5-tetrafluoro-6-oxohexanoic acid,
3,3,4,4-tetrafluoro-6-oxododecanoic acid,
6,6,7,7-tetrafluoro-5,10-tetradecadione,
4,4,5,5-tetrafluoro-6-oxooctanoic acid,
4,4,5,5-tetrafluoro-5-(1-naphthoyl) pentanoic acid, and
3,3,4,4-tetrafluoro-6-oxo-heptanal, respectively.

In addition to the sulfuric acid used to acidify the hydrogen peroxide solutions in the Examples, other strong acids, i. e., acids having a dissociation constant, K, greater than $1 \times 10^{-2}$, can be used. For example, hydrochloric and p-toluenesulfonic acids are also satisfactory for this purpose.

The tetrafluoroketaldonyl compounds of this invention are especially useful as chemical intermediates. They can all be reacted with phenylhydrazine to form colored phenylhydrazones of the aldehyde and ketone groups which are useful as coloring agents for paper, and in inks, and as oil-soluble dyes for gasoline. The aldehyde acids and the ketone acids are especially well suited for reaction wtih alcohols, e. g., ethylene glycol, to form products which are useful as plasticizers for synthetic resins and cellulose derivatives, e. g., in amount of 10% to 40% with cellulose acetate, for use as films. The dialdehydes can also be oxidized with hydrogen peroxide to diacids, which are useful for reaction with dihydric alcohols to form polyesters useful as plastics, coating compositions, films, etc. For example, these dicarboxylic acids are well suited for reaction at temperatures of 200°–250° C., as described in U. S. Patent 2,071,250, with ethylene glycol to form polyesters.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. An aliphatically saturated tetrafluoro dicarbonyl compound having an acyclic chain of four carbons between the carbonyl groups, two adjacent carbons of said chain being each attached to two fluorine atoms and the remaining two carbons of said chain being each attached to two hydrogen atoms, the remaining valence of one of the carbonyls being satisfied by a member of the class consisting of hydrogen and monovalent hydrocarbon radicals and the remaining valence of the other carbonyl being satisfied by a member of the class consisting of hydrogen, hydroxyl, and monovalent hydrocarbon radicals.

2. An aliphatically saturated tetrafluoro dicarbonyl compound having an oxo carbonyl group separated from a second carbonyl group by an acyclic chain of four carbon atoms, two adjacent carbons of said chain being attached to two fluorine atoms each, the remaining two carbons being attached to two hydrogen atoms each, the remaining valence of said second carbonyl group being satisfied by a member of the class consisting of hydrogen, hydroxyl, and monovalent hydrocarbon radicals.

3. A tetrafluoro dialdehyde having the two aldehyde groups separated by an acyclic chain of four carbon atoms, two adjacent carbons of said chain being attached to two fluorine atoms each, the remaining two carbons being attached to two hydrogen atoms each.

4. A tetrafluorodiketone having the two acyl groups joined by an acyclic chain of four carbon atoms, two adjacent carbons of said chain being attached to two fluorine atoms each, the ramaining two carbons being attached to two hydrogen atoms each.

5. A tetrafluoroketo acid having the carboxyl and acyl groups joined by an acyclic chain of four carbon atoms, two adjacent carbons of said chain being attached to two fluorine atoms each, the remaining two carbons being attached to two hydrogen atoms each.

6. A tetrafluoroaldehyde acid having the carboxyl and formyl groups separated by an acyclic chain of four carbon atoms, two adjacent carbons of said chain being attached to two fluorine atoms each, the remaining two carbons being attached to two hydrogen atoms each.

7. Process for the preparation of tetrafluorooxocarbonyl compounds which comprises bringing ozone in contact with a tetrafluorocyclohexene having two fluorine atoms on each of two adjacent carbon atoms of the ring, having two hydrogens attached to each of the remaining saturated carbons of the ring and having each valence of the unsaturated carbons which is not attached to hydrogen attached only to a monovalent hydrocarbon radical which is aliphatically saturated, and cleaving the resulting ozonide, with the proviso that when the extraannular valences of the doubly bonded ring carbons are attached to hydrogen the cleavage is under non-oxidizing conditions, and the further proviso that when the extraannular valences of the doubly bonded ring carbons are attached to monovalent hydrocarbon radicals the cleavage is in the presence of a valence electron transfer agent of the class consisting of oxidizing agents and reducing agents.

8. Process for the preparation of tetrafluorooxocarbonyl compounds which comprises bringing ozone in contact with a tetrafluorocyclohexene having two fluorine atoms on each of two adjacent carbon atoms of the ring, having two hydrogens attached to each of the remaining saturated carbons of the ring and having the extraannular valence of at least one of the unsaturated ring carbons attached only to an aliphatically saturated monovalent hydrocarbon radical, any remaining such valence being attached to hydrogen, and cleaving the resulting ozonide.

9. Process of claim 8 wherein the cleavage is under oxidizing conditions.

10. Process of claim 8 wherein the cleavage is under reducing conditions.

11. 2,7-diketo-3,3,4,4-tetrafluorooctane.
12. 6-keto-4,4,5,5-tetrafluoroheptanoic acid.
13. 2,2,3,3-tetrafluorohexane dialdehyde hydrate.
14. 5-formyl-4,4,5,5-tetrafluoropentanoic acid.
15. 5-formyl-2,2,3,3-tetrafluoropentanoic acid.

References Cited in the file of this patent

Henne at al.: JACS, vol. 65, 1943, p. 752.